(12) United States Patent
Lesea et al.

(10) Patent No.: US 7,218,670 B1
(45) Date of Patent: May 15, 2007

(54) METHOD OF MEASURING THE PERFORMANCE OF A TRANSCEIVER IN A PROGRAMMABLE LOGIC DEVICE

(75) Inventors: Austin H. Lesea, Los Gatos, CA (US); Saar Drimer, Campbell, CA (US)

(73) Assignee: Xilinx, Inc., San Jose, CA (US)

( * ) Notice: Subject to any disclaimer, the term of this patent is extended or adjusted under 35 U.S.C. 154(b) by 722 days.

(21) Appl. No.: 10/717,047

(22) Filed: Nov. 18, 2003

(51) Int. Cl.
H04B 3/46 (2006.01)
H04B 17/00 (2006.01)
H04Q 1/20 (2006.01)

(52) U.S. Cl. .............. 375/226; 375/365; 375/371; 370/509; 370/516; 714/10; 714/47; 714/703; 714/704; 714/715

(58) Field of Classification Search .......... 375/219, 375/220, 222, 224–228, 340, 344, 354, 362, 375/364, 365–366, 360, 371; 370/503, 509, 370/510, 516, 512–514; 714/2, 10, 12, 13, 714/20, 27, 36, 48, 703, 704, 714, 715
See application file for complete search history.

(56) References Cited

U.S. PATENT DOCUMENTS

| | | | | |
|---|---|---|---|---|
| 5,481,563 | A * | 1/1996 | Hamre | 375/226 |
| 6,463,109 | B1 * | 10/2002 | McCormack et al. | 375/355 |
| 6,618,686 | B2 | 9/2003 | Allamsetty | |
| 6,633,605 | B1 * | 10/2003 | Katsman et al. | 375/226 |
| 6,874,107 | B2 * | 3/2005 | Lesea | 714/725 |
| 7,025,205 | B2 * | 4/2006 | Barker | 206/438 |

OTHER PUBLICATIONS

U.S. Appl. No. 09/912,683, filed Jul. 24, 2001, Lesea.

Asad Aziz, "Passive Filters Upgrade Jitter Testing," EETimes Newsletter, Feb. 22, 2002, pp. 1-3, available from EETimes, http://www.eetimes.com/story/OEG20020214S0041.

IEEE, Draft Supplement to IEEE std. 802.3, IEEE Draft P802.3ae/D2.01, Jan. 15, 2001, pp. 1-3, available from IEEE, 3 Park Avenue, 17th Floor, New York, NY 10016-5997.

* cited by examiner

Primary Examiner—Dac V. Ha
(74) Attorney, Agent, or Firm—Walter D. Fields

(57) ABSTRACT

The performance of a serial data transceiver in a programmable logic device may be determined by applying a stress sequence of sequential data to a receiver of the transceiver, comparing the received data to reference data and determining the number of errors.

39 Claims, 6 Drawing Sheets

METHOD OF MEASURING THE PERFORMANCE OF A TRANSCEIVER IN A PROGRAMMABLE LOGIC DEVICE

FIELD OF THE INVENTION

The present disclosure relates to data communication, data communication transceiver circuits and tests therefor; and more particularly to methods of measuring the performance of multi-gigabit transceivers (MGT) in a programmable logic device (PLD).

BACKGROUND

As communication technologies evolve, data transfer speeds increase along with the amount of data being transferred. These parameters continually push the data communication industry and the communication devices for providing circuits of ever increasing data handling capability.

At the same time, the semiconductor industry strives for producing integrated circuits of greater density and smaller size. These two considerations—i.e., the demand for increased data handling capability and the push for greater levels of integration—together may be understood to increase the premium for signal interfacing within the limited pin counts available across a given area of a semiconductor device.

To assist some of these demands, some manufacturers of high-speed data communication devices have developed transceivers with parallel-to-serial and serial-to-parallel data multiplexing/de-multiplexing circuit designs. By using these multiplexing circuits, the high-pin count, parallel data interfaces may be replaced with lower pin count, high-speed serial data interfaces. On a receiver side of a transceiver, for example, a high-speed serial data sequence may be received from an I/O link and then converted into parallel data of a slower clock rate. Conversely, on the transmission side of the transceiver, parallel data of a low-clock rate may be converted from the parallel format into a higher-speed, serial format.

Thus, transceivers with parallel-to-serial and serial-to-parallel multiplexing/de-multiplexing circuits may be integrated into data communication devices to enhance their data handling capability. Accordingly, these transceiver designs have found their way into various high-density, integrated circuits such as circuits for data communication devices, data processors, network modules, switchers, relays, gateways, modems, and in particular highly integrated programmable circuits, e.g., a programmable logic device (PLD) such as a Field Programmable Gate Array (FPGA).

To assist with the sampling and detection of data from a serial data input signal, a clock recovery circuit of the transceiver may determine transitions of the input data signal and control a frequency/phase of a recovered internal clock in accordance with the frequency/phase placements relative to those of the received data signal. It may be understood, however, that in order to keep the frequency/phase of the internally recovered clock in synchronous relationship to that associated with the incoming data signal, the data signal received may need to employ an encoding/decoding protocol that can assure a sufficient number of transitions over a given interval or duration for enabling appropriate closed-loop control via the transitions of the serial data signal.

Some of these encoding/decoding protocols (e.g., Ethernet, Sonet, Infiniband, Fibre Channel, etc.) may be described as a form of "non-return to zero" encoding. In a particular example, an 8 bit/10 bit (non-return to zero) protocol may encode data to assure that only a limited number (5 bits) of same-state data bits may occur consecutively within the data stream. In other words, it may assure that, e.g., only five data bits of same state (one or zero) may occur consecutively within the serial data stream. Else, absent a sufficient frequency of state transitions within the serial data signal, the clock generator of a clock recovery circuit might begin to drift or wander relative to the frequency/phase inherent within the input data signal.

Further, it may be understood that the reliability of data recovery may be dependent upon the amount of drift/wandering, or "jitter," attributable to transceivers and their associated clock recovery circuits. Stated alternatively, the greater the performance of a given transceiver, the less wandering or drift inherent to the device, and the greater its performance and jitter tolerance thereby enabling more reliable and higher speed transfer of data. Conversely, the lower the performance and jitter tolerance of the transceiver, the lower the reliability and speed of its associated serial data transfer. Therefore, it may be understood that both the speed and reliability of a serial data communication link will depend on the jitter tolerance or performance level of the data transceivers.

Accordingly, when producing integrated circuits including programmable logic semiconductor devices, e.g., FPGA, that may comprise transceiver circuits embedded therein, which may be employed with high-speed data communication applications, it may be helpful to rate their level of performance. Further, it may be helpful to enable such rating capability in a production environment for benefit of providing classification of the components that may be produced for given data communication applications, and capable of yielding results in a short period of time.

SUMMARY

Performance of a serial data transceiver in a programmable logic device may be determined by applying a stress sequence of sequential data to a receiver and determining the number of errors produced by the data recovery circuitry as may be caused, for example, by a clock data recovery circuitry.

By pushing the clock recovery circuit of a receiver with a stress sequence of input data of same-state duration, for example, of a time lapse $t_1$ to reach an error threshold region near the waterfall portion of a jitter characteristic curve of receiver recovery circuits, the jitter performance of transceiver in a field programmable gate array may be tested within a short period of time and in a fashion providing simple metrics for its jitter tolerance. Additionally, performance levels therefore may be extrapolated into the normal, lower time-lapse regions for predicting bit error rate characteristics for the transceiver within its normal operating regions.

Furthermore, in particular embodiments, available resources within field programmable gate array may be employed to assist the testing of the transceivers so as to form a method and or system employing built-in self testing principles within the field programmable gate array by which to readily and efficiently determine the jitter performance of transceivers. By using these built in self testing configurations, some of the more traditional expensive test equipment for pattern generation, jitter inducement, sync-clock measurements, and error rate determinations may be eliminated and replaced with more reasonably condensed designs of the present invention. Furthermore, by rating performance levels based upon these error count metrics, different parts may be specified across different frequencies and run-length for various applications associated with high-speed serial data communication systems.

BRIEF DESCRIPTION OF THE DRAWINGS

Embodiments and features of the present invention will become more apparent from the detailed description and the appended claims, with reference to the accompanying drawings, in which:

DETAILED DESCRIPTION

In the following description, numerous specific details may be set forth to provide an understanding of exemplary embodiments of the present invention. It will be understood, however, that alternative embodiments may comprise sub-combinations of the disclosed examples.

Additionally, readily established circuits and procedures of the exemplary embodiments may be disclosed in simplified form (e.g., simplified block diagrams and/or simplified description) to avoid obscuring an understanding of the embodiments with excess detail. Likewise, to aid a clear and precise disclosure, description of known processes—e.g., triggering, clocking, state-machine, programming procedures—may similarly be simplified where persons of ordinary skill in this art can readily understand their structure and operations by way of the drawings and disclosure.

Figure 1:
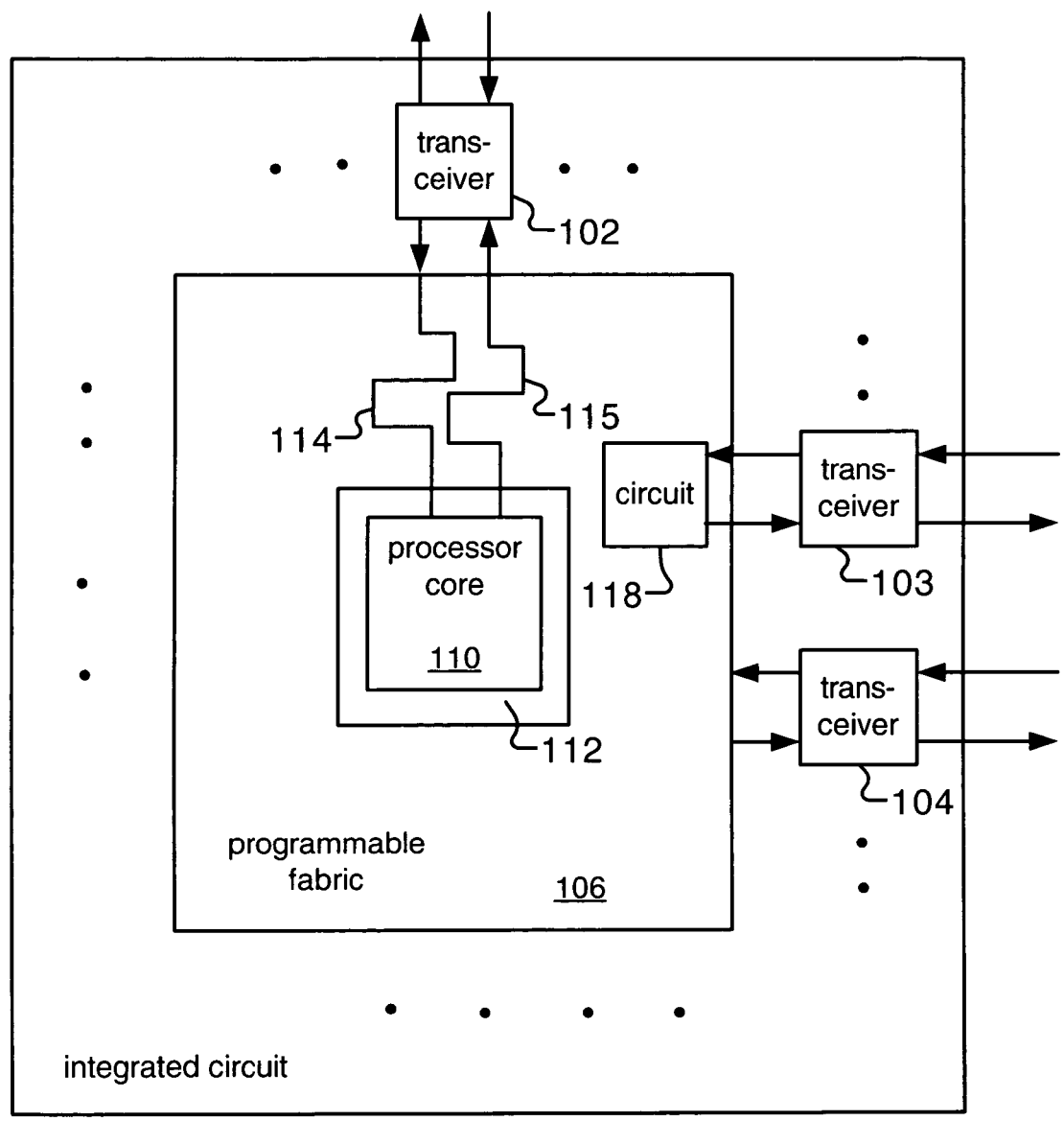
FIG. 1 is a simplified block of diagram showing a programmable integrated circuit in accordance with an embodiment of the present invention.

Referencing FIG. 1, an integrated system, e.g., a programmable logic device (PLD), may comprise a plurality of transceivers 102–104 to be interfaced with an embedded programmable fabric 106. In one embodiment, programmable fabric 106 may comprise a portion of a field programmable gate array (FPGA). Processor core(s), such as processor core 110, can be optionally embedded inside programmable fabric 106. Interface layer 112 may facilitate communication between embedded processor core 110 and fabric 106. Further referencing FIG. 1, a pair of paths 114–115 may interface transceiver 102 to processor core 110 through interface layer 112.

A user may configure a plurality of circuits in programmable fabric 106, which may also include portions to communicate with transceivers 102–104. For example, a circuit 118 of the programmable device may be coupled to communicate with transceiver 103. In particular embodiments, the transceivers (in addition to other logic devices and programmable fabric 106) may be configurable.

To assist configuration of the programmable logic device, a host programmer may include configuration data that may be programmed into configuration memory of the programmable logic device and used to configure the programmable resources of the device. Some of the configuration memory cells may structure interconnects of the programmable fabric 106, while other configuration memory cells may be used to configure transceivers (for example, 102–104). For example, the configuration memory cells may comprise different portions for configuring two separate transceivers, such as transceiver 103 separate from transceiver 104.

In accordance with particular embodiments of the present invention, the host programmer may program data into the configuration memory cells for interconnecting a first internal block memory to a transmitter of a transceiver, and a second internal block memory to a reference comparator. Other locations of the configuration memory cells may be used, e.g., to define interconnects and busses within the transceivers. Such selectable or programmable configurations might thereby include or exclude various sub-components of the transceiver that might otherwise be associated with the typical handling of data. Thus, a portion of the transceiver may be configured by the configuration data of the host processor to control operation of, for example, a clock recovery circuit, an elastic buffer, a decoder, or a cyclic redundancy coder.

Figure 2:
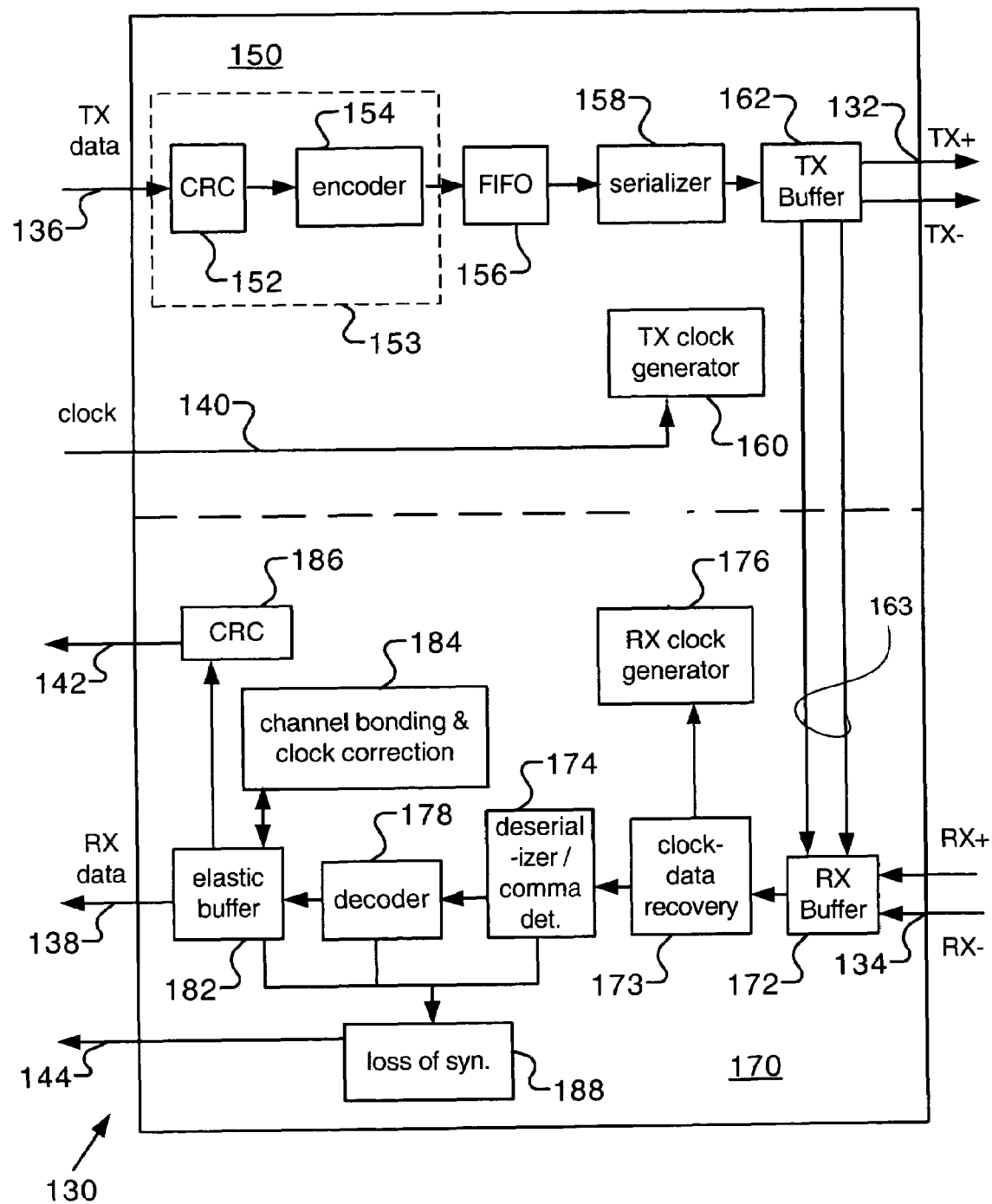
FIG. 2 is a blocked diagram showing an example of transceiver that may be tested within a programmable logic device in accordance with an embodiment of the present invention.

Referencing FIG. 2, an example of a transceiver 130 may comprise serial output and input ports 132 and 134 to communicate with an external device. Output port 132 may propagate serial data of a differential output signal and input port 134 may receive serial data of a differential input signal. Transceiver 130 may process the data that is to be exchanged to/from internal circuits of an integrated system or data processor via the transmitter and receiver data busses 136 and 138.

A plurality of clock signals (shown collectively along signal line 140) may support clocking of data at the transmitter side of the transceiver such as at transmit buffer 162. At the receiver side of the transceiver, a clock recovery circuit may generate a tune signal for tuning a receiver clock generator for use in driving receiver buffer 172. Transceiver 130 may further comprise cyclic redundancy code (CRC) circuitry 186 of known protocol provisions for operating a CRC status signal 142.

In one embodiment, the width of the data paths 136 and 138 may be independently configurable and can be selected to be 1, 2, or 4 bytes. In other embodiments, the data paths 136 and 138 may have other widths.

Addressing the transmitter side 150 of transceiver 130, data of data path 136 may be selectably (or optionally) processed by a CRC generator 152. This CRC generator may compute and insert known CRC, such as encoding of a 32-bit CRC algorithm into data packets that are to be transmitted.

The resultant CRC encoded data may then be delivered to a non-return to zero encoder 154. In one embodiment, encoder 154 may comprise a known 8B/10B protocol encoder. Although a specific example of "non-return to zero" encoding may be disclosed for 8B/10B, it is understood that other embodiments may comprise alternative protocols—e.g., 64B/66B or others. Returning to the particular example, the 8B/10B code may use 256 data characters and 12 control characters such as those that may be used in the Gigabit Ethernet, XAUI, Fibre Channel, and InfiniBand protocols. Such encoder may accept 8 bits of data along with a K-character signal for a total of 9 bits per character applied. If the K-character signal is "High", the data will be encoded into one of the 12 possible K-characters available in the 8B/10B code. If the K-character input is "Low", the 8 bits will be encoded as standard data.

The encoded data may then be delivered to a transmit FIFO buffer 156 and then to serializer 158. A clock of the internal system may drive operation of the encoder 154 and a higher frequency of clock generator 160 may drive serializer 158 and transmit buffer 162. In some embodiments, these two clock signals may be frequency locked. Although frequency locked, the two clock signals may have different relative phase relationships. Accordingly, transmit FIFO buffer 156 may be operable to absorb phase differences between the two frequency-locked clock signals.

FIFO buffer 156 may deliver data to serializer 158, which may then multiplex and convert the parallel data into a serial bit stream. Transmit buffer 162 may then drive the differential lines of output port 132 with the serial bit stream.

Turning now to the receiver side 170, transceiver 130 may further comprise a receiver clock generator 176 that may generate a reference clock for driving certain parts of the receiver. Receive buffer 172 may buffer the serial data of an input signal received from differential lines of input port 134. A clock-data recovery circuit 173 may receive the buffered data and serial data associated with the input signal. The clock recovered may comprise a frequency and phase correlated with the frequency and phase of the incoming serial data. This recovered clock may then be used for detection and recovery of the data for presentment to deserializer 174, decoder 178 and elastic buffer 182.

Deserializer 174 may convert data of a serial bit format into parallel digital data. In a further embodiment, deserializer 174 may also perform comma detection. In some decoding algorithms, (such as of the 8B/10B protocol), a "comma" may be used as a distinguishable pattern by which to assure determination of the byte boundaries and frames within the serial data. For example, two comma patterns of known 8B/10B protocol may comprise a comma "plus" and a comma "minus". Detection of a comma may then define the byte alignments within the received serial bit stream. In one embodiment, programmable cells of the configuration memory may establish the control signals to control whether the comma detection circuit is to realign the byte boundaries on comma plus, comma minus, both, or neither.

In exemplary operation, decoder 178 may receive data from deserializer 174. When enabled, it may decode and, in accordance with its selected configuration, raise a synchronous "comma" flag (as a status bit to be attached to each received byte at the transceiver's programmable fabric interface) on comma plus only, comma minus only, both, or neither. In further embodiments, it may set this flag for valid commas only.

Upon leaving decoder 178, the decoded data may be sent to an elastic buffer 182. Elastic buffer may perform channel bonding and clock correction as driven by clock correction controller 184. Elastic buffer 182 may be configurable for various configuration options such as:

(a) use or bypass;
  (b) enablement of clock correction; and
  (c) levels to signal overflow or underflow conditions.

Configuration options might also include choice of channel bonding modes, the selection of a selectable number of channel bonding sequences, establishing a selectable length for matching a selectable byte value (8-bit or 10 bit), and similar provisions for clock correction sequences.

After re-synchronization by the elastic buffer, the data may then be delivered to an internal system, such as the programmable fabric, across data bus 138, which may be programmed for a 1, 2, or 4 bytes width.

In further embodiments, the transceiver may also comprise an elastic buffer 182 that may be optionally connected to a known CRC verification block 186. This block may, for example, verify that the commonly used 32-bit cyclic redundancy code appears at the end of the received data packets. A signal may then be delivered to the internal system on line 142 to indicate the CRC verification.

Transceiver 130 may further comprise a loss of synchronization detector 188. It may interpret outputs of comma detector 174, decoder 178, and elastic buffer 182 to determine whether the incoming bytes of the data stream are in synchronization. A signal may then be delivered to the programmable fabric on line 144 to report the synchronization status.

Again, for a programmable logic device, the configuration information for configuring the transceivers may be stored in known programmable configuration memory. Accordingly, a user may select different options for the programmable logic device based on the configuration data provided to the FPGA.

Although showing the most important signals and sub-components of the transceiver for assisting understanding of the present invention, it will be understood that there may also be other signals and sub-components to the transceiver.

The integrity of data detection and recovery within a transceiver may be dependent to a great extent upon the jitter performance associated with the transceiver. For example if a serializer and transmit buffer add jitter to a data communication signal, then a receiver may incorrectly detect zero data as a one, or conversely one data as a zero. Similarly, if the receive buffer of a receiver contributes noise to the received input signal, then again data errors may result. Accordingly, it may be important to establish an ability to quantify the performance of hi-speed transceivers within a device, such as a field programmable gate array, in order to determine its effectiveness for serial data transfer applications. For example, it may be helpful to distinguish products that may be capable of operating with serial data transfer rates as high as 3.125 Gbs per second vs. those that may only be able to reliably transfer data with rates less than 2.5 Gbs per second.

Customary processes for testing the performance of transceivers have typically involved test patterns of standards organizations such as the XAUI jitter test standards of the IEEE (see draft to IEEE standard 802.3, annex 84 of, IEEE draft P 802.3ae/D2.01, Jan. 15, 2001) (discussing various test patterns and procedures of the XAUI jitter working group). However, these exemplary methods for testing transceivers have generally required extensive equipment for generating the test patterns to be applied to the transmitter channel and other equipment to log recovered data received by the receiver channel. Use of such equipment may be cumbersome, lengthy, and impractical, and even if used, may only offer first order pass/fail effectiveness.

In the fields of microwave digital communications, microwave digital radios, cell phones, optical devices, and wireline digital interfacing, procedures have been taught for testing communication units in regions of enhanced error probability. Borrowing from these fields, the present disclosure proposes methods and systems by which to test transceivers with ready effectiveness and ease, and internally within programmable logic devices.

Figure 4:
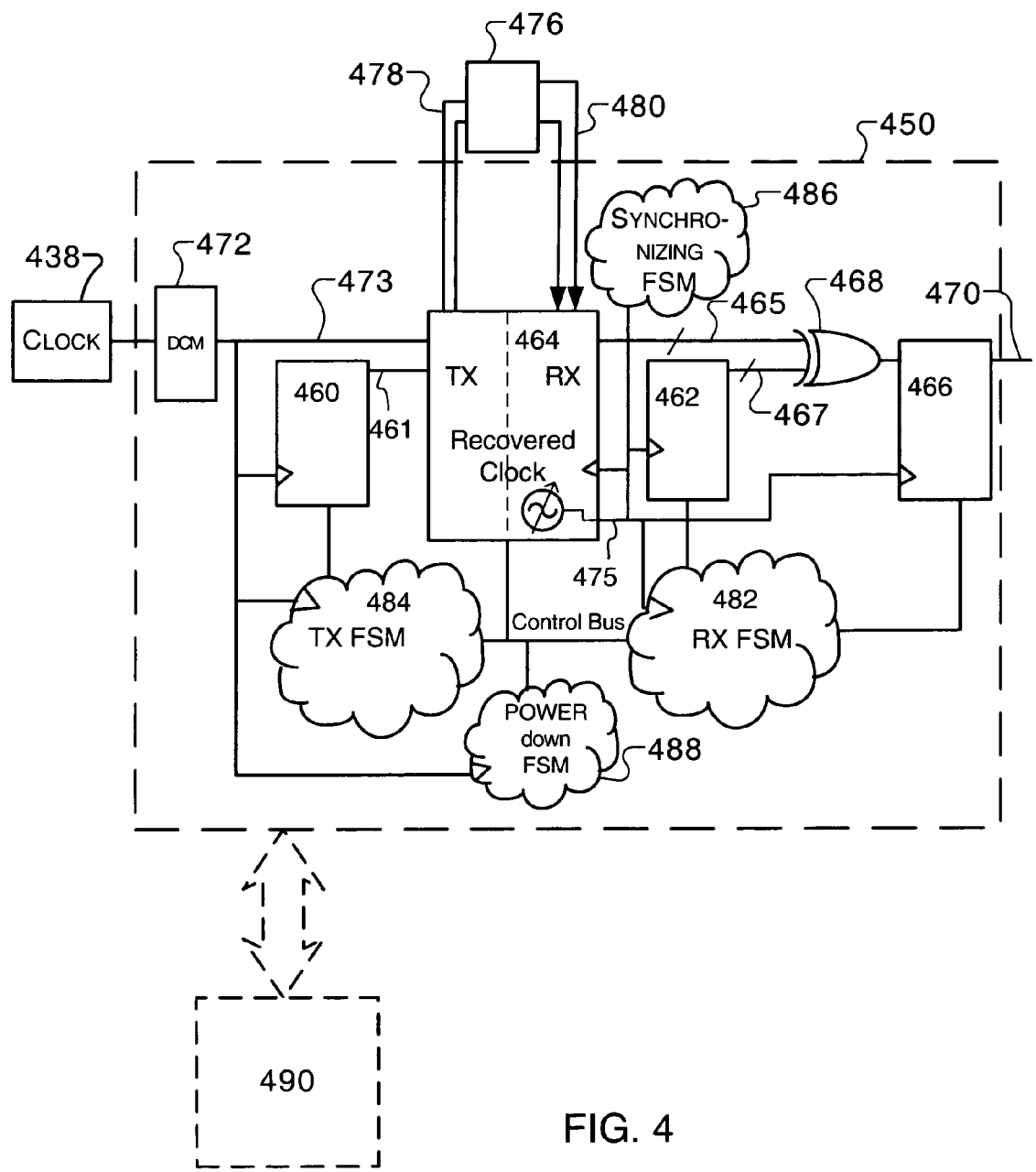
FIG. 4 is a blocked diagram showing a system for testing a transceiver in accordance with an embodiment of the present invention.

Referencing FIG. 4, in accordance with an embodiment with the present invention a programmable logic device 450 may comprise transceiver 464 (which may be similar to transceiver 130 of FIG. 2) coupled with other programmable elements for assisting testing of its jitter performance. A digital clock manager 472 may receive a signal from an external source 438, and be programmed for generating an external frequency useful for driving certain internal logic of the programmable logic device 450 via line 473. In a particular example, the external source 438 may supply a frequency of 50 MHz and the digital clock manager 472 may be configured to synthesize an internal operating frequency of, for example, 156 MHz. In particular embodiments, the digital clock manager may comprise an internal phase lock loop for locking and controlling its frequency relative to the frequency of the external source. For assisting a further understanding of certain principles of the present invention, assuming an internal operating frequency of 156 MHz and assuming a 20 bit width for data words supplied to the serializer 158 (FIG. 2) associated with the transmission channel of the transceiver 464, the resulting output signal produced on the serial output 478 may comprise a data transfer rate of up to 3.125 Gbs (20 bits×156 MHz). Although described relative to certain frequencies herein for assisting an understanding of certain embodiments of the present invention, it will be understood that alternative methods and embodiments may include frequencies and data transfer rates other than the 50 MHz external (or in some cases internal) source, the 156 MHz internal frequency and the 3.125 Gbs data transfer rate.

During a test mode of operation, the digital clock manager 472 typically maintains a locked condition in which its phase lock loop remains locked to a reference signal. In some embodiments of the present invention, however, the phase lock loop may be reset or power cycled in order to test performance of the transceiver and of the programmable logic device in various acquisition states of the phase lock loop associated with the digital clock manager. In further embodiments, some performance measures can be obtained even in the absence of phase lock loop control of the digital clock manager. For example, certain jitter measures may be determined on the receiver side as being largely dependent upon the clock recovery circuits, which may have little dependence upon the digital clock manager.

Further referencing FIG. 4, state machines 482, 484 can provide known operable control along internal control busses that may be configured to assist access of first and second block memories 460, 462. The transmitter state machine 484 may be configured to sequence the address map of first block memory 460 in order to retrieve predetermined test data previously stored within the memory, which can be propagated by transmitter data bus 461 to the input of the transmitter. On the receiver side, the receiver state machine 482 may control indexing within the address map of second block memory 462 by which to retrieve sequences of reference data for comparison by comparator 468. Digital clock manager 472, as an internal clock, may drive the transmitter state machine, while the receiver state machine 482 may work off of a "recovered clock."

Power-down state machine 488 can be used to assist power cycling and initialization of circuits within the programmable logic device 450, which can assist certain optional procedures of performance testing.

Synchronizing state machine 486 can determine when a known framing event has been detected by the receiver and may establish an offset for an index into the address map of the second block memory 462 relative to the index for accessing the first block memory 460. With an appropriate offset, sequences retrieved as reference data may correspond to those of the predetermined test data that that are to be expected from the received data. In other words, the synchronization state machine can fix an offset between the different indexes of the block memory 460 on the transmitter side and the block memory 462 on the receiver side so as to effectively accommodate delays of the overall data communication channel.

Although particular embodiments were described with state machines that may sequence various operations of the sub-modules, it may be understood that alternative embodiments may comprise, e.g., an embedded processor for performing these operations. Such internal processors may be programmed with machine-readable instructions that when executed may perform procedures as may be disclosed herein relative to the state machines.

Referencing FIGS. 2 and 4, delays of the data communication channel may include those of FIFO registers 156, serializing multiplexer 158, and transmitter buffer 162 on the transmitter side; delays of the transmission link 476 (or internal link 163) between the transmitter output 132 and the receiver input 134; and delays of receive buffer 172, clock-data recovery circuit 173, deserializing/de-multiplexer 174, decoder 178 and FIFOs or elastic buffers 182 on the receiver side. Each of these elements associated with the transceiver can contribute to the overall latency (propagation delay) between the moment data is presented by first block memory 460 to interconnect 461 for transmitter input 136 and the moment it may be recovered at the receiver's output 138 and provided over interconnect 465 to comparator 468. It may be noted that each of these same elements may be similarly capable of contributing an accompanying jitter component with their respective delay durations. Assuming identical data contents of the first and second block memories, the index into the address map of the second block memory for retrieval of the reference data may, therefore, be understood to require an offset (of perhaps multiple frames) relative to the indexing into first block memory for correlating appropriately the reference data relative to data recovered by the receiver.

Figure 5:
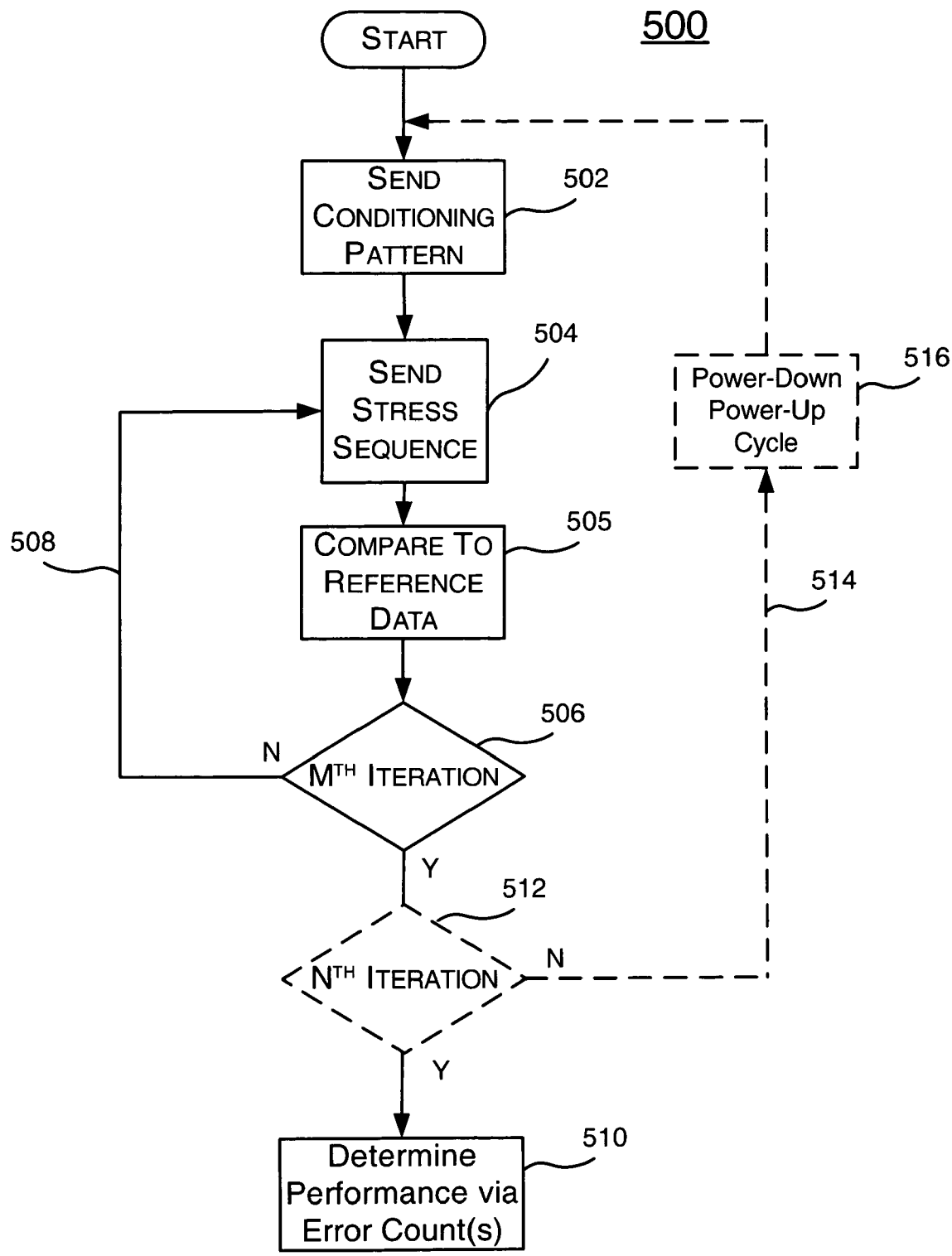
FIG. 5 is a simplified flow chart showing an exemplary method for testing the performance of a transceiver for jitter tolerance in accordance with an embodiment of the present invention.

In one embodiment for testing performance of the transceiver for jitter tolerance, referencing FIGS. 4–5, first and second block memories 460 and 462 may be previously programmed with same identical internal data. First memory block 460 may be previously programmed with test data that may be retrieved and transmitted to the transmitter portion of the transceiver. Second memory block 462 may be programmed with reference data that may be the same as the predetermined test data for a delayed presentation to comparator 468. In a particular embodiment, transmitter data bus 461 may comprise a width (e.g., 20 bits) for propagating words of parallel bit format from the memory to the transmitter. Likewise, the second block memory 462 may be coupled via bus 467 to the reference port of the comparator 468 using an interconnect width (e.g., 20 parallel bits) corresponding to that of the receiver's data bus 465.

A host programmer 490 may be operable to program configuration memory of the programmable logic device to configure its various modules, including those of transceiver 464, and may be further operable to configure the transceiver in coupled relationship to memory blocks 460, 462 and respective configurations for state machines 482, 484, 486 and 488, digital clock manager 472, comparator 468, and counter 466 as illustrated by the example in FIG. 4. The host programmer may further configure data sequences that may be stored into the first and second block memories 460 and 462 for respective test and reference data.

Upon initiating a performance test 500, further referencing FIGS. 4–5, data words of the predetermined test data may be retrieved sequentially from first memory block 460 and output (e.g., 20 parallel bits at a time) to transceiver 464. Turning to FIG. 2, the transmitter 150 may receive the parallel data on its input data bus 136 and may process the data for serial output at output 132. In embodiments of the present invention, encoders 153—such as those for error redundancy (cyclic redundancy coder 152) or non-return to zero encoding per encoder 154—may be configured by host programmer 490 to be selectively bypassed within the transmission channel. By this configuration, data words received from the first block memory can be propagated directly to FIFO registers 156 and serializing multiplexers 158. Accordingly, stress sequences of same-state data may be transmitted directly from the block memory for transmission, and may comprise durations substantially longer than the run-lengths that would otherwise be available via typical encoding circuits.

In a particular embodiment, the host programmer may configure the predetermined test data to comprise a conditioning preamble followed by a stress sequence. Therefore, when retrieving contents of the first block memory during the performance testing, a conditioning preamble may be sent 502 to the transmitter followed by 504 the stress sequence.

Data serialized may then be transmitted to the receiver of the transceiver. In a particular embodiment, transmission line 476 of predetermined delay may propagate the signal from the transmitter output 478 to the receiver's input 480. Assuming words comprising a width of 20 bits from first block memory and assuming an internal clocking frequency of about 156 MHz, a serial data transfer rate (between the transmitter an receiver) may be established at about 3.125 Gbs. To assist some customary methods of jitter performance testing, and to provide flexibility for optional selectable alternatives that may accompany some of the embodiments of the present invention, the transmission line 476 may be provided with an electrical delay sufficient to enable certain customary forms of stability (i.e., bit error rate (BER)) testing. Thus, the transmission line may be configured with an electrical length greater than five wavelengths (5λ) of the frequency associated with the rate of serial data transfer—e.g., 3.125 Gbs. In one example, it may be formed as a transmission line structure on an FR-4 substrate medium (PC board) of about 20 inches physical length. Although a test system may be configured in this fashion with transmission line 476 to assist some alternative methods of testing, in accordance with some embodiments of the present invention, such external interconnect can be omitted.

For example, further referencing FIG. 2, the host programmer of a test system may program configuration memory of the programmable logic device 130 to configure an internal link 163 (e.g., via resources of the programmable fabric of the programmable logic device) directly between the output of the transmitter buffer 162 and the input of the receiver buffer 172. With such a link configured internal to programmable logic device 450, self-testing for jitter performance of the transceiver may be performed conveniently within the device.

Figure 3:
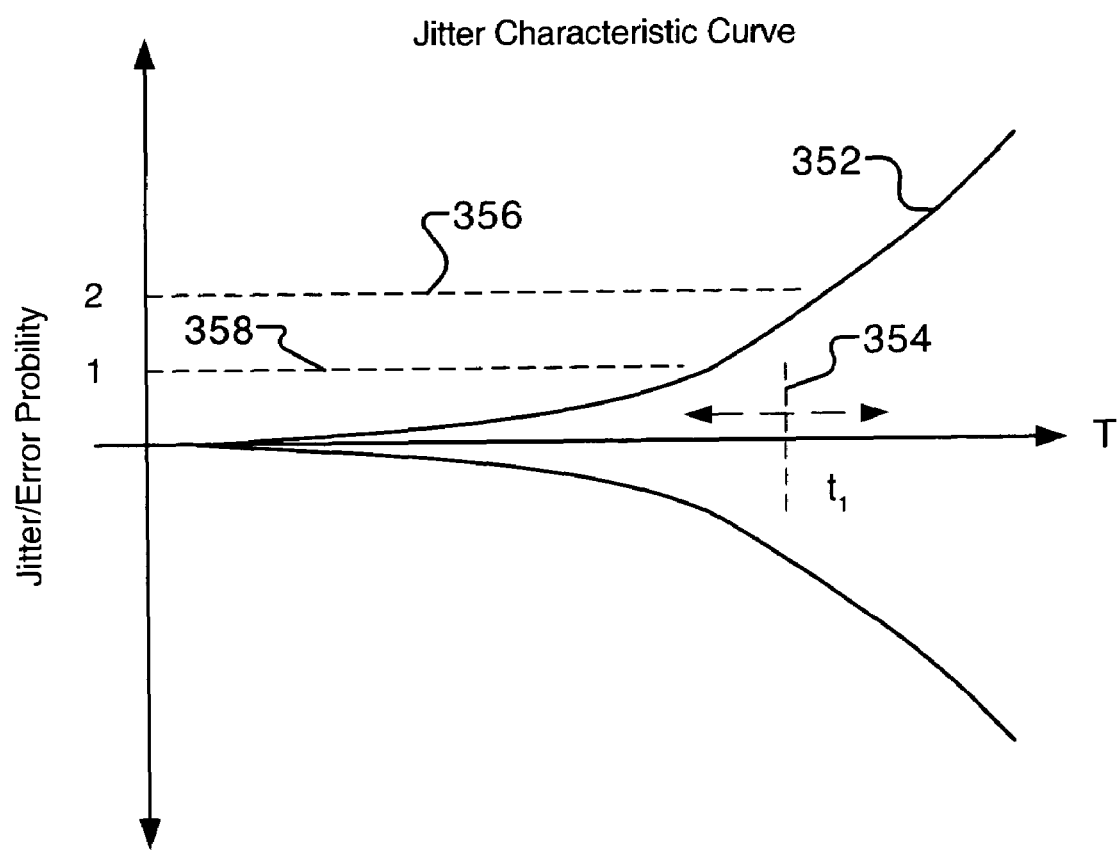
FIG. 3 is a graph showing a jitter characteristic curve useful for describing a method of testing in accordance with an embodiment of the present invention.

On the receiver side, working with a different clock domain, clock recovery circuitry (173 FIG. 2) may recover a clock based upon transitions of the data input signal. In a particular embodiment, the clock recovery circuit may comprise a phase lock loop for locking a frequency/phase of the receiver's clock generator 176 relative to the frequency/phase accompanying the transfer rate of the received input signal. As input transitions are received, the time relative placements thereof may be compared with respect to transitions of the recovered clock for generating a phase error signal, which may be used to generate a feedback control signal for correcting the frequency/phase of the recovered clock. During a preamble sequence within the serial data received, repetitive data state transitions can assist tight closed-loop control of the frequency/phase of the receiver's clock generator. Following the preamble conditioning, however, a stress sequence may present same-state data over an extended time lapse. Absent the repetitive signal transitions of the input signal, the phase lock loop may essentially leave the clock generator of the receiver free-running. Relative to FIG. 3, this may be effectively viewed or modeled so as to shift the operational sampling transitions within the data detector circuitry 173 into time-lapse, stress regions 358–356 along a jitter characteristic curve 352 of greater error probability.

In accordance with one embodiment of the present invention, a run-length $t_1$ may be determined along a time interval 354 of the jitter characteristic curve 352 for a typical transceiver device for extending the data recovery provisions of the receiver into an error probability growth region. The determination may be performed by logic pre-configured within the fabric of the programmable logic device, or the determination may be performed by a processor external or internal to the programmable logic device.

The growth region of the jitter characteristic curve may be known as a "water fall" or "avalanche" zone. When working within such "water fall" zone, the receiver's data recovery/detection circuitry may perform with a bit error rate of, e.g., about one to two bit-errors per frame sequence or higher. In particular embodiments, the stress sequence may be configured for the predetermined test data based upon the run-length determination. In a particular embodiment, a host programmer may program the stress sequence with 400 consecutive zeros within the test data for programming into the first memory block. It may be understood, however, that alternative embodiments may comprise values other than 400 and may also extend the run-length beyond the maximum lengths typically specified by a non-return to zero protocols (e.g., 8B/10B encoding protocol).

In a further embodiment, the preamble preceding the stress sequence may be configured for a low stress sequence such as 1-1-0-0-1-1-0-0- . . . or 1-1-1-0-0-0-1-1-1-0-0-0- . . .

Such a sequence may have a sufficient number of transitions to enable the clock recovery circuit to acquire lock for synchronizing frequency and phase, but may have a frequency less than the high frequency transition rate of a sequence such as 1-0-1-0- . . . , which may overburden edge detection circuits associated with preliminary clock recovery operations for acquisition. The low-stress pattern data may be sustained for a plurality of data frames sufficient to establish a stable operating condition of the transceiver before launching into the stress sequence of the test pattern. For example, the conditioning pattern may comprise a low-stress, alternating sequence of pairs of one's and zero's for a duration of 200 frames (e.g., 4000 sequential bits). This value may be altered in alternative embodiments, so long as establishing a conditioning duration sufficient to allow settling of clock recovery circuitry dynamics and settling of other control loops as may be associated with other modules of the receiver circuitry, e.g., deserializer 174 and elastic buffer 182, in the transceiver.

Continuing with further reference to FIGS. 4–5, after sending the stress sequence and while receiving it at the receiver, the recovered data may be directed to comparator 468. Corresponding sequences of reference data may be retrieved from the second block memory 462 for comparison 505 with the recovered data. If an error is determined, comparator 468 may signal the error to be counted by counter 466.

The sending of the stress sequence, receipt, comparison and error counting can be repeated for M iterations (506, 508) and the counter 466 may obtain a cumulative error count from the various repeats. Upon concluding M iterations with the stress sequence, the whole test sequence may optionally be repeated and may incorporate a power cycle 516 (power-down and power-up) of the transceiver. The power cycle may reset circuits of the transceiver before launching into the test sequence again with the preliminary preamble and subsequent stress sequences. In particular examples, the power cycle may cause a phase lock loop of the clock recovery circuit to release lock of the receiver clock generator (176 FIG. 2). Upon power-up, the phase lock loop may then restore its phase-lock condition and may exercise an alternative lock condition. For some programmable logic devices, the phase lock loop may perform differently for different lock states. Therefore, the repeats, inclusive of the power cycling, can allow the phase lock loop to acquire phase-lock at different relative lock placements, which in turn can affect overall error probabilities and jitter performance of the transceiver. Therefore, a plurality 512, 514, 516 of the overall test runs N may be performed to assure an averaging of different operating conditions into the error count determinations. Upon completing the N overall iterations, the error count from the counter 466 may be retrieved and used to rate a performance for the transceiver. In one example, the count may be retrieved by an internal embedded processor, which may determine the performance (via self-testing, analysis and/or diagnostics) and rate the individual performance of transceiver in the programmable logic device. Although described in this example as being retrieved and analyzed by an internal processor, in alternative embodiments, the count value may be delivered to logic circuits that have been pre-configured within the fabric of the programmable logic device or to an external processor or system for determining performance levels and/or recording.

In a further embodiment, error counts from the different runs of the overall N test sequences may be examined to flag whether or not a particular run may have produced error counts significantly greater (i.e., of statistically significant magnitude) than other runs. Such a distinctive characteristics can be used to signal a possible problem with a phase lock loop or clock recovery circuit.

Figure 6:
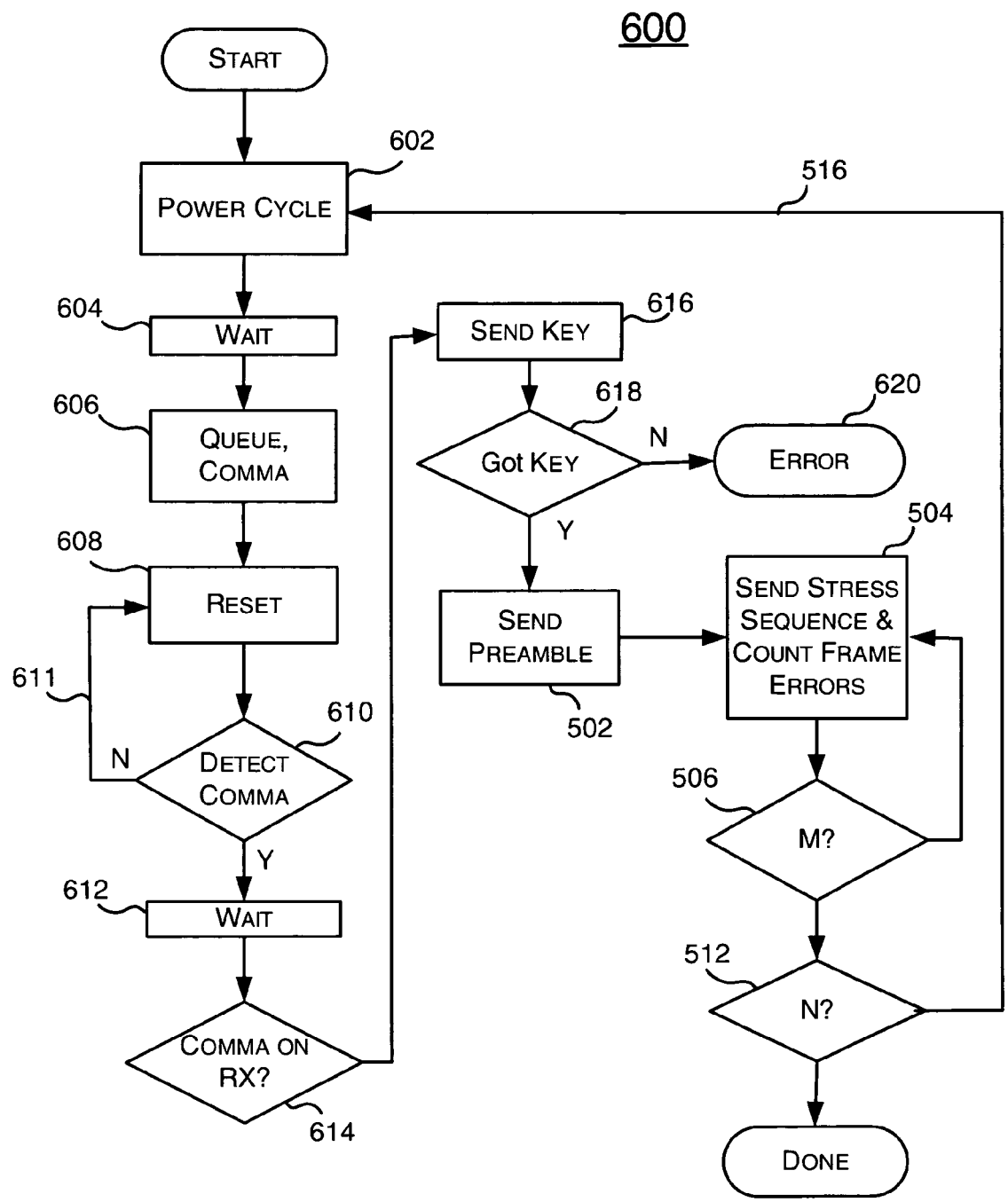
FIG. 6 is a simplified flow chart showing another exemplary method for testing the performance of a transceiver for jitter tolerance in accordance with an embodiment of the present invention.

In a further embodiment of the present invention, referencing FIGS. 2, 4 and 6, a method 600 for testing jitter performance of a transceiver may begin with a power-down and power-up (power cycle 602) for the transceiver. After waiting 604 for a brief duration, a framing event may then be placed 606 onto the transmitter's data bus 461. This framing event may be incorporated as part of the predetermined test data, which may have been previously configured by the host processor and stored within the first block memory 460. The framing event may be of a given serial data transfer protocol, e.g., 8B/10B encoding protocol, and can be disposed within the test data before the stress sequence and before the conditioning preamble. In the case of the 8B/10B protocol, the framing event may comprise a comma.

Further referencing FIGS. 2 and 6, after placing the comma on the transmitter bus 461, a reset 608 may be performed for the transmitter and receiver to clear any queuing registers—e.g., FIFOs 156 and elastic buffers 182 and data recovery circuits 174, 178. The host processor may then monitor 608, 610, 611 the protocol detection circuitry of deserializer 174 for detection 610 of a comma event (framing event). If the comma has been detected at the transmission side, the process may then proceed to determining 614 a comma at the receiver. The wait 612 may first be provided to account for propagation delays of the receiver buffer 172, data-clock recovery circuit 173, and the deserializer and decoder circuitry 174, 178. In some embodiments, the wait duration may be set for as long as about 64 cycles.

Next, in further embodiments, a key may be submitted 616 for transmission between the transmitter and the receiver. The key may comprise an extended pattern (e.g., 80 bits or four frames of data) of little stress. This may assure that the data can be transmitted through the communication channel, and also to locate relative indexes between the respective first and second block memory addresses. Once the framing and key events have been detected 618 at the receiver side, synchronization state machine 486 (FIG. 4) may appropriately fix the offset between the index to the reference data relative to that for retrieving the test data for placement on the data bus for the transmitter. In the event the key data is not recovered at the receiver, an error may be reported 620.

Up to this level, the procedure may be viewed as having established a first tier of self-test—e.g., verifying the fundamental operability of the transmitter's multiplexing and transmission, and also the fundamental operability of the receiver's data recovery, demultiplexing and frame/key detection. Upon completing the synchronization adjustments and the phase lock loop acquisition, the method of testing 600 may proceed with the procedures 502–516 as described previously herein with reference to FIG. 5. The performance of the transceiver for jitter tolerance may then be rated based on at least one of the duration of the stress pattern's run length and the number of error counts resulting from the repetitive stress tests.

While certain exemplary features of the embodiments of the invention have been illustrated and described herein, many modifications, substitutions, changes and equivalents may now occur to those skilled in the art. It is, therefore, to be understood that the appended claims are intended to cover all such embodiments and changes as fall within the spirit of the invention.

What is claimed is:

1. A method of measuring performance of a transceiver of a programmable logic device for jitter tolerance, comprising:

operating a receiver of the transceiver and receiving a data signal of a predefined serial data sequence;

recovering a clock signal from the data signal received;

detecting data bits from the data signal received using timing of the recovered clock signal;

comparing the data detected to reference data related to the predefined data sequence;

counting a number of error events resulting from the comparing over a duration encompassing a plurality of data bits of the predefined data sequence; and quantifying performance of the receiver based on at least one of the count duration, the number of error events counted, and the predefined data sequence.

2. The method of claim 1, further comprising:
synchronizing the recovered clock relative to transitions of the data signal;
the detecting data to further comprise determining a framing event of a predetermined transfer protocol;
upon determining the framing event, reformatting respective plurality of serial data of the data detected into data words of a parallel bit format;
retrieving the reference data for the comparing from a data source preconfigured with data words of the same predefined data sequence; and
aligning the word sequences of the retrieved reference data to correlate with respective words to be detected from the data received;
the aligning based upon the framing event and synchronized with the recovered clock.

3. The method of claim 2, continuing the counting over a duration to encompass a statistically significant number of data bits of the predefined data sequence.

4. The method of claim 3, in which the framing event is of a non-return to zero protocol, and the aligning comprises:
detecting a comma from within a sequence of the detected data, and
responsive to detecting the comma, adjusting an index by which to retrieve a portion of the reference data related to the comma event of the same predefined data sequence.

5. The method of claim 4, further comprising configuring the predefined serial data sequence to comprise a stress sequence following the framing event, the stress sequence configured with consecutive, same-state data bits for a run-length greater than the maximum specified by the transfer protocol.

6. The method of claim 5, in which the non-return to zero protocol comprises an 8B/10B protocol and the stress sequence is configured for a run-length greater than 10 consecutive same-state bits.

7. The method of claim 5, further comprising:
determining an elapsed time relative to one of a predefined error probability or a jitter characteristic curve for extending into the waterfall region of the characteristic curve; and
defining the run-length to the stress sequence based on the determined elapsed time.

8. The method of claim 5, in which the configuring the predefined serial sequence further comprises grouping a plurality of the framing events before the stress sequence.

9. The method of claim 8, in which the configuring the predefined serial sequence further comprises incorporating a conditioning preamble between the framing events and the stress sequence.

10. The method of claim 9, further comprising defining the conditioning preamble to last for a duration of at least one settling-time constant of a transfer function associated with the control-loop of the clock recovery circuit.

11. The method of claim 10, further comprising:
forming the conditioning preamble with multiple data state transitions per frame; and
using the conditioning preamble for at least a part of the synchronizing of the recovered clock.

12. The method of claim 3, wherein the comparing and the counting comprise:

comparing the reformatted data words relative to respective data words of the reference data to determine any differences therebetween; and
counting the number of comparisons yielding a difference determination.

13. The method of claim 3, wherein the comparing and the counting comprise:
comparing word-to-word the decoded data relative to that of the reference data; and
counting the number of bit errors therebetween.

14. The method of claim 2, further comprising:
sending to the receiver as a part of the predefined serial data sequence, a conditioning preamble followed by a stress sequence;
performing the synchronizing of the recovered clock during an interval of the data signal associated with the conditioning preamble; and
performing the comparing and the counting over an interval of the data signal associated with the stress sequence.

15. The method of claim 14, further comprising:
repeating a plurality of times the sending of the conditioning preamble followed by the stress sequence, the synchronizing of the recovered clock during the respective conditioning pattern repeats, and the comparing and the counting over the respective stress sequence repeats; and
combining the counts counted and basing the performance upon the combined count.

16. The method of claim 15, the plurality of repeats comprising N groups of M iterations, the method further comprising resetting at least a portion of the transceiver circuitry between at least some of the groups of the N groups.

17. The method of claim 16, in which the resetting comprises:
reinitiating a phase lock loop acquisition for the clock recovery;
resetting buffers of the transceivers; and
re-framing data of the input data signal relative to framing events determined therefrom.

18. The method of claim 15, further comprising cycling the power of the transceiver between some of the iterations of the plurality of repeats.

19. The method of claim 1, in which the quantifying the performance comprises extrapolating a serial data transfer rate capability for the transceiver based upon the number of error events counted, the count duration and the predefined data sequence.

20. A method of testing the performance of a transceiver in a programmable logic device (PLD), comprising:
retrieving pre-determined test data from a first memory device;
multiplexing data words retrieved from the first memory to convert it from a word format into a serial format;
transmitting the serially formatted data by operating a transmitter of the transceiver;
receiving an input signal corresponding to the transmitted serially formatted data by operating a receiver of the transceiver;
detecting receive data from the input signal received;
de-multiplexing the detected receive data to convert it from a serial format to a word format;
retrieving reference data related to the predetermined test data from a second memory;
comparing the words de-multiplexed from the detected receive data to respective words of the reference data;

determining errors based upon the comparing;
counting any errors determined; and
rating a performance of the PLD based on the errors counted.

21. The method of claim 20, in which the receiving and the detecting of data from the input signal comprise:
sensing transitions of the received input signal;
generating a recovered clock;
controlling, with given control loop dynamics, the frequency of the recovered clock based upon the relative time placement of the transactions of the input signal with respect to those of the recovered clock; and
continuing the comparing and counting of the determined errors over a continuous duration substantially greater than the characteristic settling time constant associated with the control loop dynamics.

22. The method of claim 21, further comprising:
configuring the predetermined test data within the first memory to comprise a stress sequence of consecutive same-state data;
defining a run-length for the consecutive, same-state data to extend over a stress duration;
storing the same stress sequence for at least or part of the reference data in the second memory; and
performing the comparing and the counting over the stress duration of the stress sequence.

23. The method of claim 22, further comprising:
storing conditioning data in the first memory at a location thereof for retrieval as a preamble before the stress sequence;
when receiving the preamble portion of the input signal, using transitions of the conditioning pattern and synchronizing the recovered clock relative thereto; and
after the synchronizing of the recovered clock with the conditioning preamble and during an interval of time associated with receipt of the transmitted stress sequence, performing the retrieval of the reference data, the comparing, and the determining and the counting of errors.

24. The method of claim 23, further comprising repeating each of:
the retrieving, the multiplexing, and the transmitting to again transmit a preamble and stress sequence;
the receiving of an input signal corresponding to the transmitted serial data of the preamble and the stress sequence;
the retrieving of the reference data, the comparing and the determining and counting of errors; and
basing the performance rating upon the accumulated error counts.

25. The method of claim 24, further comprising:
performing the repeating a plurality of times; and
performing a power-down and power-up cycle of the transceiver with each of N groupings of M iterations of the plurality of repeats.

26. The method of claim 25, further comprising:
propagating the serial data from a transmitter of the transceiver to a receiver thereof along a transmission line configured with at least one of D.C. or A.C. coupling therebetween.

27. The method of claim 26, further comprising:
employing a framing event of a predetermined transfer protocol within the predetermined test data;
detecting the framing event within the sequential data of the input signed received;
correlating the data sequences of the reference data to be retrieved from the second memory so as to correspond with respective sequences of the predetermined test data expected from the de-multiplexed data; and
performing the correlating based upon the detection of the framing event.

28. The method of claim 20, in which the transmitting and the receiving are performed by respective transmitter and receiver circuits of the programmable logic device within part of internal self-testing of the programmable logic device.

29. A system for testing performance of a transceiver of an integrated circuit, comprising:
a first memory addressable to source predetermined test data, wherein the predetermined test data includes a stress sequence of a run length of same-state sequence of consecutive data bits;
a transmitter of the transceiver to receive data output by the first memory and to output it for propagation to a receiver of the integrated circuit;
the receiver to receive an input signal propagated from the transmitter;
a second memory addressable to source reference data related to the predetermined test data of the first memory;
a comparator to compare data received by the receiver to reference data retrieved from the second memory; and
a counter to count error events determined by the comparator.

30. The system of claim 29, further comprising:
a transmission channel to propagate the signal output from the transmitter to the receiver.

31. The system of claim 30, in which the transmission channel comprises an interconnect internal to the integrated circuit.

32. The system of claim 29, further comprising a processor to:
determine jitter performance of the transceiver based on the run-length of the same-state sequence configured for the test data, and the error count determined by the counter.

33. The system of claim 32, in which
the integrated circuit comprises a programmable logic device with selectably configurable resources;
the processor, the counter, the comparator, the first and second memory, the receiver and the transmitter embedded as a part of the programmable logic device;
the system further comprising a host programmer comprising configuration data to configure the configurable resources of the programmable logic device to:
route data from the first memory to a serializer of the transceiver and to by-pass a CRC encoder thereof;
enable a clock recovery circuit of the receiver to recover a clock signal from the data transitions of the received input signal; and
detect and de-serialize data of the input signal synchronous with the recovered clock.

34. The system of claim 33, the configuration data of the host programmer further to configure:
the first memory with a sequence of conditioning data as a preamble before the same-state consecutive sequence;
the clock recovery circuit to synchronize the recovered clock using the preamble portion of the receiver input signal; and
the run-length for a duration to substantially exceed a settling-time constant associated with the dynamic responsiveness of the clock recovery circuit.

35. The system of claim 34, in which the run-length is of a duration to exceed a maximum duration of a non-return-to-zero encoding protocol.

36. The system of claim 35, the processor further to cause a repeat for a plurality of times:
- output from the transmitter of the preamble and the same-state, consecutive sequence;
- synchronization of the recovered clock to respective preamble sequences; and
- accrued counting by the counter of the respective error counts.

37. The system of claim 36, the processor further to cause resetting of at least portions of the transceiver between at least some of the plurality of repeats.

38. The system of claim 29, in which the integrated circuit comprises a programmable logic device with programmable resources selectably programmable to configure at least a portion of the first memory with the test data for transfer to the transmitter, the second memory with the reference data for transfer to the comparator, and the counter to count the errors determined by the comparator.

39. The system of claim 38, in which the programmable logic device further comprises configuration memory with configuration data by which to program the programmable resources for the system for testing performance.

* * * * *